(12) United States Patent
Chittipeddi

(10) Patent No.: US 6,246,325 B1
(45) Date of Patent: Jun. 12, 2001

(54) DISTRIBUTED COMMUNICATIONS SYSTEM FOR REDUCING EQUIPMENT DOWN-TIME

(75) Inventor: Sailesh Chittipeddi, Allentown, PA (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/442,688

(22) Filed: Nov. 18, 1999

(51) Int. Cl.[7] .................................................. G08B 21/00
(52) U.S. Cl. ........................ 340/540; 340/506; 340/522; 340/531; 340/825.36; 700/108; 700/241; 702/194; 702/185
(58) Field of Search .................................... 340/540, 522, 340/506, 524, 531, 533, 534, 539, 825.36; 700/241, 108; 399/10, 18; 702/33, 34, 36, 58, 59, 182, 184, 185

(56) References Cited

U.S. PATENT DOCUMENTS

| | | | |
|---|---|---|---|
| 4,390,750 | * 6/1983 | Bartelink | 379/42 |
| 4,412,292 | * 10/1983 | Sedam et al. | 700/241 |
| 4,622,538 | * 11/1986 | Whynacht et al. | 340/506 |
| 4,856,047 | * 8/1989 | Saunders | 379/57 |
| 5,029,290 | * 7/1991 | Parsons et al. | 340/533 |
| 5,061,916 | * 10/1991 | French et al. | 340/522 |
| 5,325,156 | * 6/1994 | Ulinski | 355/209 |
| 5,414,494 | * 5/1995 | Aikens et al. | 355/202 |
| 5,666,585 | * 9/1997 | Nagira et al. | 399/10 |
| 5,710,723 | * 1/1998 | Hoth et al. | 702/181 |
| 5,907,491 | * 5/1999 | Canada et al. | 700/108 |
| 6,032,001 | * 2/2000 | Miyawaki | 399/8 |

* cited by examiner

Primary Examiner—Daniel J. Wu
Assistant Examiner—Toan Pham
(74) Attorney, Agent, or Firm—Steve Mendelsohn (57) ABSTRACT

A system and method to more efficiently exchange information between a service provider, such as a semiconductor company, and its remote equipment units. The system capable of immediately handling a number of information items, each belonging to a different remote equipment unit is disclosed. The system includes a central controller configured for interfacing with a plurality of remote equipment units via a wireless network. The central controller is configured to receive information from each remote equipment unit via a wireless network. This information includes alarm conditions and corresponding requests for repair. Each of the remote equipment units is identified by a unique code which is included in the information transmitted to the computer to identity the source (i.e., identity of the transmitting remote equipment unit). The central controller uses the code of the transmitting remote equipment unit to retrieve the corresponding data record stored in its memory. The repair person identified in the selected data record is then contacted automatically, e.g., by wireless paging. The system may be programmed with a pre-determined routine maintenance schedule for each remote equipment unit. Based on this schedule, the system automatically contacts the appropriate repair person by wireless paging and dispatches the repair person to the corresponding remote equipment unit for routine maintenance. Thus, the down-time of the remote equipment unit is reduced because the alarm condition is immediately transmitted to the central controller and the corresponding repair person is contacted automatically. There is no undesired down-time before monitoring personnel notices the alarm condition and contacts the corresponding repair person.

17 Claims, 5 Drawing Sheets

DISTRIBUTED COMMUNICATIONS SYSTEM FOR REDUCING EQUIPMENT DOWN-TIME

BACKGROUND OF THE INVENTION

1. Field of Invention

The present invention relates to processes and equipment for communications between service providers and their remote equipment units, and more particularly, but not exclusively, to improving the efficiency of information exchange between the service providers and their remote equipment units.

2. Description of Prior Art

It is common for a business to have equipment units placed at remote locations. For example a semiconductor equipment company may place various manufacturing plants worldwide at remote locations. Generally, the remote equipment units (e.g., the manufacturing plants) are chosen by semiconductor company at locations which are physically situated close to the actual customer sites (e.g., users of semiconductor chips). The remote equipment units are generally monitored by sensors and other monitoring equipment including audio alarms and LED displays. If the remote equipment unit fails or is otherwise in need of repair, the sensors and other monitoring equipment indicate an alarm condition. Monitoring personnel notice the alarm condition and then contact a repair person by phone or other means (e.g., computer, pager, etc.). The repair person then visits the remote location to place the customers back in service.

Unfortunately, this process consumes a considerable amount of time. In particular, there is an undesirable down-time before the monitoring personnel notice the alarm condition and contact the repair person. The dollar cost increases drastically when the manufacturing plants are down for an extended period of time and the production has been stopped.

A different problem arises when the monitoring personnel are not available at the remote locations to watch for alarm conditions and to contact the repair person, e.g., during off-duty hours. In this case, the down-time is further exacerbated by the fact that the alarm conditions may go unnoticed for long periods of time.

Indeed, delays in contacting the repair person and in repairing the remote equipment units may be quite costly, especially when the business is handling crucial equipment. In a semiconductor industry, the manufacturing of chips may consist of several pieces of fabrication equipment and the down-time associated with any of the fabrication equipment can cause shut down of actual production.

One approach to these problems is to have the repair person be available at the remote location, but this strategy often adversely impacts the cost of the business. Additionally, more than one repair person (i.e., each having a different expertise) may be required for each type of equipment, thereby making it nearly impossible to have all required expertise available at the remote location.

Thus, there remains a need for a system and method for coordinating the prompt and efficient exchange of alarm and other information between service providers and their remote equipment units.

SUMMARY OF THE INVENTION

A system and method to more efficiently exchange information between a business, such as a semiconductor equiment company, and its remote equipment units are provided.

In accordance with one embodiment of the present invention, a distributed communications system capable of immediately handling a number of information items, each belonging to a different remote equipment unit is disclosed. The distributed communications system includes a central controller configured for interfacing with a plurality of remote equipment units via a wireless network. The central controller is configured to receive information from each remote equipment unit via a wireless network. This information includes alarm conditions and corresponding requests for repair. Each of the remote equipment units is identified by a unique code which is included in the information transmitted to the computer to identity the source (i.e., identity of the transmitting remote equipment unit). The central controller uses the code of the transmitting remote equipment unit to retrieve the corresponding data record stored in its memory. The repair person identified in the selected data record is then contacted automatically, e.g., by wireless paging.

Thus, the down-time of the remote equipment unit is reduced because the alarm condition is immediately transmitted to the central controller and the corresponding repair person is contacted automatically. There is no undesired down-time before monitoring personnel notices the alarm condition and contacts the corresponding repair person.

The distributed communications system of the present invention is also capable of keeping track of routine maintenance schedules. The distributed communications system may be programmed with a pre-determined routine maintenance schedule for each remote equipment unit. Based on this schedule, the distributed communications system automatically contacts the appropriate repair person by wireless paging and dispatches the repair person to the corresponding remote equipment unit for routine maintenance.

In one embodiment, the present invention is a method comprising the steps of: (a) determining at the central controller that a service condition exists for a particular equipment unit; and (b) automatically transmitting a service request to notify a repair person remotely located from both the central controller and the particular equipment unit about the service condition.

In another embodiment, the present invention is a central controller for maintaining operability of a plurality of equipment units remotely located from the central controller, wherein the central controller determines that a service condition exists for a particular equipment unit; and the central controller automatically transmits a service request to notify a repair person remotely located from both the central controller and the particular equipment unit about the service condition.

Yet in one more embodiment, the present invention is an alarm transmitter configured to a particular equipment unit for maintaining operability of the particular equipment unit, wherein the alarm transmitter detects an alarm condition at the particular equipment unit and automatically transmits an alarm message identifying the particular equipment unit to the central controller, which, in turn, transmits a repair request to a repair person remotely located from both the central controller and the particular equipment unit about the alarm condition.

BRIEF DESCRIPTION OF THE DRAWINGS

Further objects, features, and advantages of the present invention shall become apparent from the detailed drawings and descriptions provided herein.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

Figure 1:
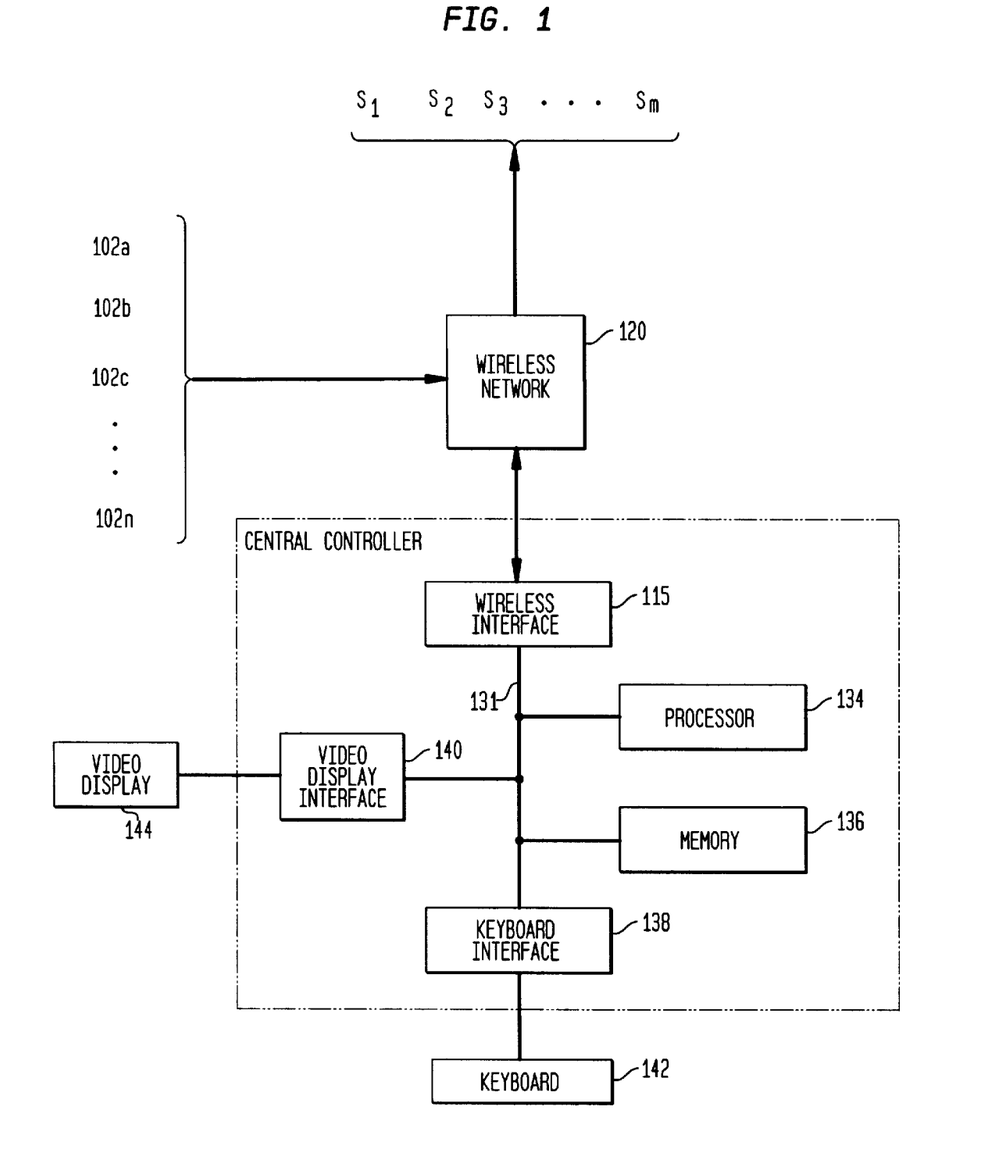
FIG. 1 is a block diagram of a distributed communications system according to one embodiment of the present embodiment.

FIG. 1 illustrates a distributed communications system 100 according to one embodiment the present invention. Generally, system 100 comprises a central controller 130 which provides automated management of communications between remote equipment units 102a–102n and repair persons S1, S2, S3, . . . , Sm of the business; where n and m represent the numbers of remote equipment units and repair persons respectively, expected to utilize system 100. Each of repair person S1–Sm is provided with a wireless pager. Each wireless pager has a unique code and is configured to receive communication signals from a wireless network 120.

Central controller 130 and remote equipment units 102a–102n communicate via wireless network 120. Wireless network 120 may be an external or public telephone network, an internal office telephone network, or a combination of both. Wireless network 120 may be a cellular network, a telemetry system, or a personal communications system. Central controller 130 is configured to send and receive communication signals from wireless network 120.

Each remote equipment unit 102a–102n has an alarm transmitter configured to communicate to wireless network 120. For example, a basic transceiver may be coupled to remote equipment unit by an interface device which is adapted to the type of equipment. An advantage of this construction is that a small, low-cost, and easy-to-manufacture device may be readily adapted to be installed on pre-existing equipment without costly system upgrading.

Central controller 130 has a bus 131 interconnecting a wireless interface 115, a processor 134, a memory 136, a keyboard interface 138, and a video display interface 140. Keyboard interface 138 is operatively coupled to a keyboard 142, and video display interface 140 is operatively coupled to a video display (e.g., a computer monitor) 144. Memory 136 is used to store a database comprising equipment codes for each remote equipment unit and contact information for the corresponding repair person. Memory 136 may also be used to store a routine maintenance schedule for each remote equipment unit.

Central controller 130 is adapted to handle remote communications to and from each remote equipment unit 102a–102n. Central computer 130 receives communication signals embedded with alarm conditions and other information from each remote equipment units 102a–102n. Processor 134 evaluates the incoming alarm signal to determine the source of the information (i.e., the identity of the transmitting remote equipment unit) and the nature of the alarm condition. Processor 134 then searches the database stored in memory 136 to find the contact information of the repair person responsible for repair of the transmitting remote equipment unit. Central controller 130 then alerts the corresponding wireless pager of the repair person via wireless network 120.

Central controller 130 communicates with wireless network 120 via wireless interface 115. Wireless interface 115 functionally interconnects central controller 130 to wireless system 120. Wireless interface 115 includes an analog-to-digital (A/D) converter to convert incoming signals received from wireless network 120 an analog format into a digital format for storage in memory 136. Also, wireless interface 115 includes a digital-to-analog (D/A) converter for communicating stored digital signals over an during outbound communication with wireless network 120.

Central controller 130 may be a collection of one or more electronic components or a single custom integrated component. For example, central controller 130 may include digital circuits, analog circuits, fuzzy logic circuits, or a combination of these circuit types. Computer 130 may be programmable by software or firmware or be "hard-wired" as a state machine, or employ a combination of these techniques. However, it is preferred that central controller 130 be a programmable personal computer with software and hardware customized to practice the present invention.

This preferred configuration may include communication links to other I/O devices (not shown) such as a printer, loud speaker, microphone, mouse, modem, computer network, or other types of I/O devices as would occur to one skilled in the art. It is also preferred that processor 134 be a microprocessor of conventional configuration. Nonetheless, in other embodiments, central controller 130 may be arranged differently to provide the desired functionality.

Figure 2:
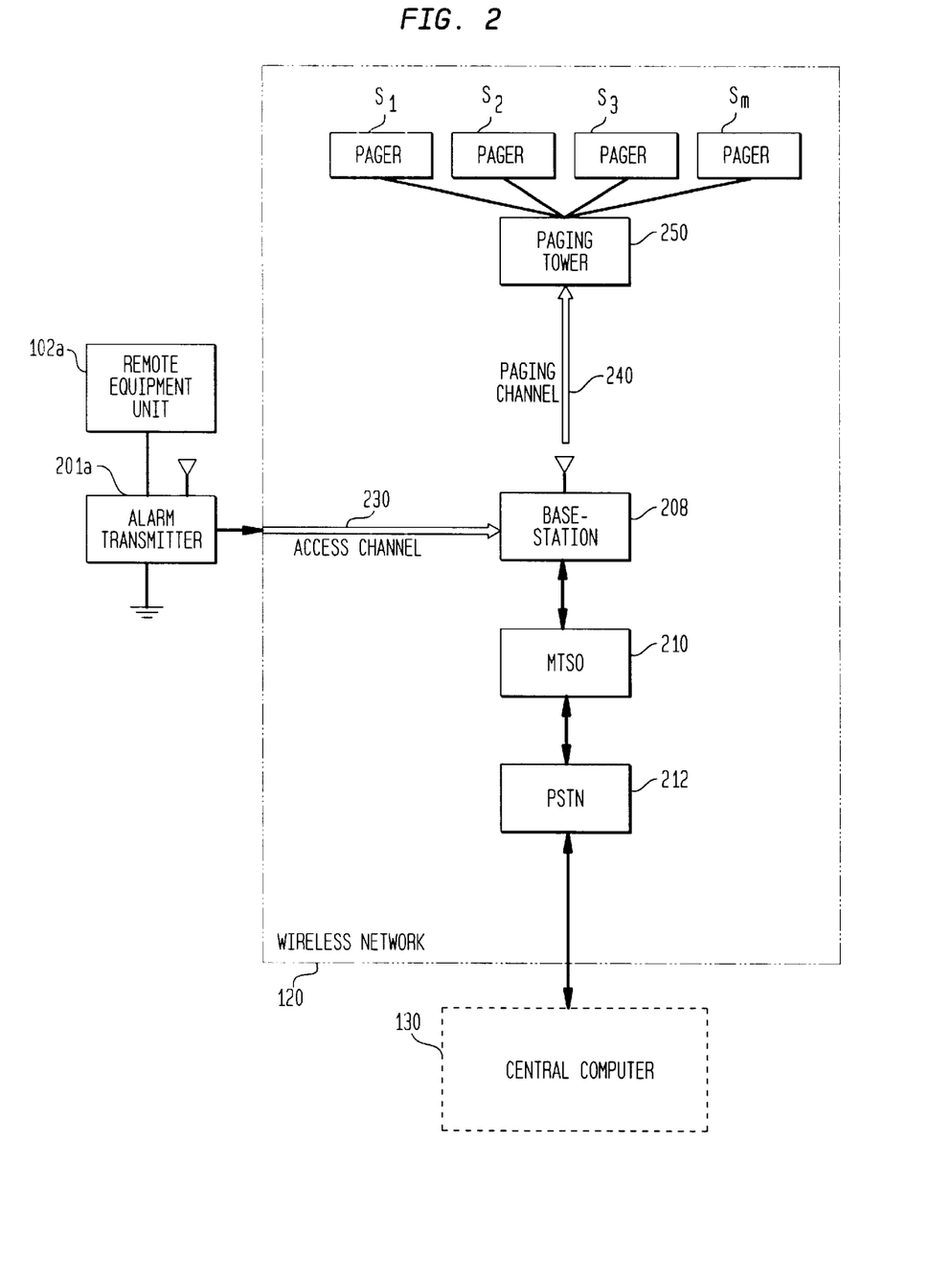
FIG. 2 is a block diagram illustrating major components of the wireless network used in distributed communications system.

FIG. 2 illustrates major components of wireless network 120 of FIG. 1. In a preferred embodiment, the alarm transmitters 201a–201n coupled to remote equipment units 102a–102n transmit their alarm conditions and other reporting messages to central controller 130 by using wireless network 120, which is preferably a conventional wireless network comprising at least one base-station 208 and a mobile telephone switching office (MTSO) 210, which interfaces with a public-switched telephone network (PSTN) 212.

Generally, alarm transmitters 201a–201n transmit signals to base-station 208 over access channel 230. Base-station 208 receives signals from remote equipment units 102a–102n and forwards these signals to central controller 130.

Base-station 208 is also configured to transmit signals tot he wireless pagers of the repair person via paging channel 240. Generally, base-station 208 receives paging signals generated by central controller 130 and forwards these paging signals to a paging tower 250 via paging channel 240. Paging tower 250 is configured to transmit these paging signals to the wireless pagers of the repair persons. In the preferred embodiment, base-station 208 and MTSO 210 are part of a code-division multiple-access (CDMA) spread spectrum communication system. Additionally, wireless network 120 may be designed in accordance with the Telecommunications Industry Association Electronic Industries Association (TIA/EIA) Interim Standard 95 (IS-95) standard, entitled "Mobile Station Base-Station Compatibility Standard for Dual-Mode Wideband Spread Spectrum Cellular System." Alternatively, the wireless communication system may be designed in accordance with the ANSI J-STD-008, standard entitled "Personal Station-Base-Station Compatibility Requirements for 1.8 to 2.0 GHz Code Division Multiple Access (CDMA) Personal Communications Systems."

However, it should be noted that the teachings of the present invention are applicable to other wireless communication systems whether cellular or non-cellular, and regardless of the modulation scheme employed. For example, the present invention is equally applicable to time-division multiple-access (TDMA) based systems such as the U.S. TDMA standard IS-54, or the pan-European standard Global System for Mobile Communications (GSM). Additionally, the teachings of the present invention are applicable to analog frequency modulation communication systems, such as the Advanced Mobile Phone System (AMPS).

FIG. 2 and its related description is described in the context of a wireless network, wherein the wireless network acts as a communicating medium between the remote equipment units and the central controller as well as between the central controller and the wireless pagers of repair persons. In practice, various different alternative embodiments may be utilized, e.g. two separate networks may be utilized wherein the first network facilitates communications between the remote equipment units and the central controller, and the second network facilitates communications between the central controller and the wireless papers. In the case of two networks, the first network may be a land-line network providing direct connectivity between the remote equipment units and the central controller, and the second network may be a wireless network.

Figure 3:
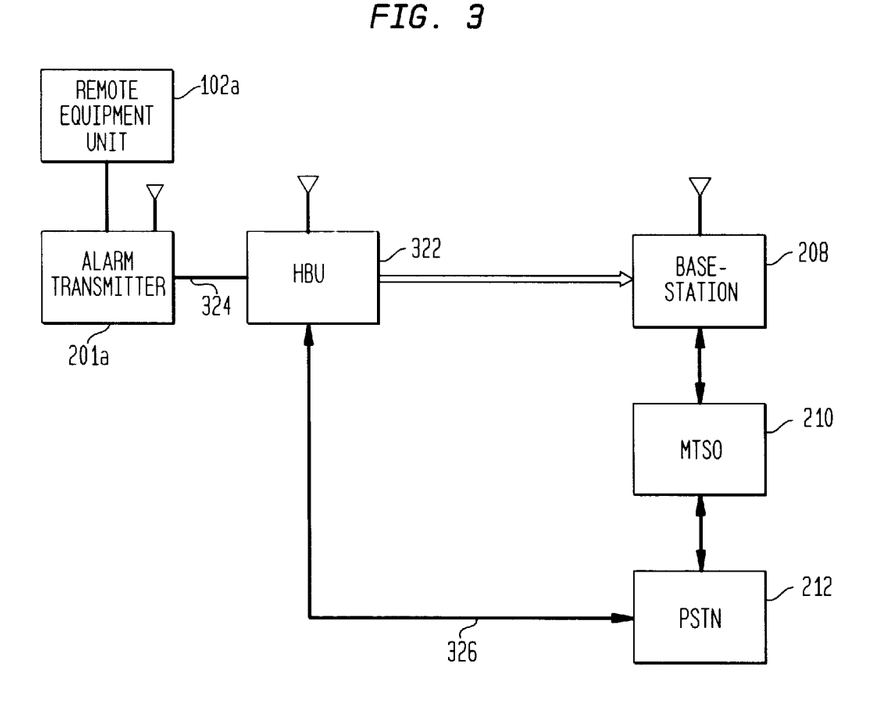
FIG. 3 is a block diagram illustrating communication between the remote equipment units and the wireless network in accordance with a first embodiment.

Alarm transmitters 201*a*–201*n* may transmit their respective alarm signals to central controller 130 in a variety of different ways. As illustrated in FIG. 3, in a first embodiment based on one of the previously mentioned CDMA standards, the alarm transmitters 201*a*–201*n* transmit their reporting messages to a respective home base unit 322. For example, in FIG. 3 alarm transmitter 201*a* is shown communicating with home base unit (HBU) 222 over communication link 324.

In this first embodiment, link 324 may be a wireless RF link over a licensed or unlicenced RF band, in which case both alarm transmitter 201*a* and HBU 322 would employ RF transceivers. An advantage to using an RF link for link 324 is that the transmitting power, and thus the cost, of alarm transmitter 201*a* is small due to the relatively short distance between alarm transmitter 201*a* and HBU 322. Alternately, link 324 may be an electrical power line capable of employing power-line carrier (PLC) modulation, and both alarm transmitter 201*a* and HBU 322 employ PLC transceivers.

In this first embodiment, HBU 322 preferably collects and transmits the reporting messages generated by remote equipment unit 102*n* to base-station 208 over a telecommunications channel. This telecommunications channel may be a random-access CDMA channel which nominally provides for call originations, responses to pages, orders, and registrations for conventional subscriber stations.

However, it should be noted that, in alternate embodiments, HBU 322 may utilize a pre-installed land-line communication link 326 connected directly to PSTN 212 in order to communicate with central controller 130. This alternate embodiment would have the advantage of reduced cost of communication if a pre-existing land-line communication link 226 already existed at the remote location.

Figure 4:
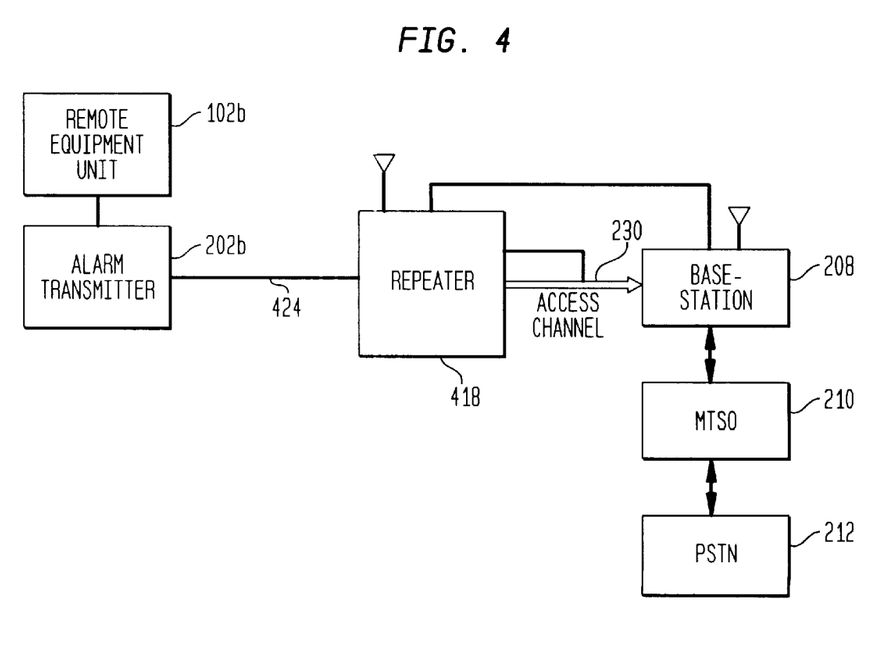
FIG. 4 is a block diagram illustrating communication between the remote equipment units and the wireless network in accordance with a second embodiment.

In a second embodiment of the present invention, as illustrated in FIG. 4, each of the alarm transmitters, e.g., alarm transmitter 201*b*, may comprise a low-power CDMA transceiver such as that described with reference to the first embodiment. However, instead of the HBU 322 providing the intermediate "hop" to base-station 208, a CDMA repeater 418 would relay RF signals over access channel 230 from the alarm transmitters to base-station 208. CDMA repeater 418 would comprise, for example, a high-power amplifier and associated transponding circuitry as is known in the art. CDMA repeater 418 could be located, for example, at the top of a utility pole or on a rooftop, to provide, sufficient line-of-sight communication with both the alarm transmitters and base-station 208.

An advantage of using CDMA repeater 418 to relay messages back and forth between the alarm transmitters and base-station 208 is that the RF power output of alarm transmitters 201*a*–201*n*, and consequently their cost, would be reduced significantly over embodiments where the alarm transmitters must each transmit enough power to contact base-station 208 directly over an access channel. Although the alarm transmitters would be on the order of 500 feet to 1,000 feet from CDMA repeater 418, CDMA repeater 418 itself could be on the order of six or seven miles from the nearest base-station 208.

Additionally, CDMA repeater 418 is much less complex and less expensive to manufacture, install, and maintain than base-station 208. Thus, the effective coverage area of base-station 208 may be extended by CDMA repeater 418 without the need for additional base-stations.

It should be noted that CDMA repeater 424 could utilize a wire-line backhaul interface to base-station 208, such as fiber optic lines or the like, depending on the nature of the installation site, and the availability of wire-line resources near the installation site. Such a fiber-optic outfitted repeater 418 would include the same RF link to the alarm transmitters as was discussed above, but would have a fiber-optic link to the base-station 208.

Yet, in one more embodiment, the alarm transmitters communicate directly with base-station 208 over an access channel. In this embodiment, the alarm transmitters would require a higher-power transceiver than that used for the first and second embodiments. However, initial installation and retrofitting of the existing remote equipment units would be easier because HBU 222 and CDMA repeater 218 would not be needed.

In any of these embodiment wireless network 120 is configured to provide communications capabilities between remote equipment units 102*a*–102*n* and computer 130. Wireless network 120 also provides wireless communication capabilities between computer 130 and the wireless pagers of the repair persons SI-Sm.

Figure 5:
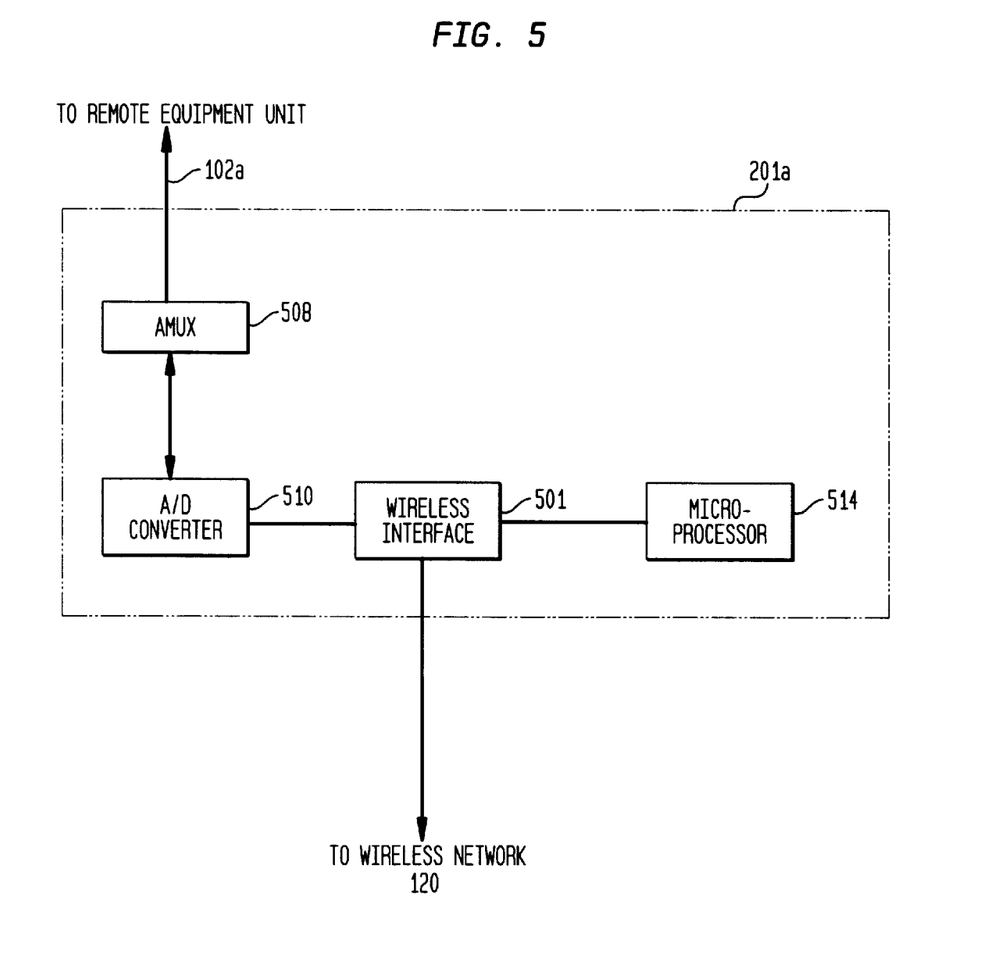
FIG. 5 illustrates an exemplary remote equipment unit having capabilities.

Referring now to FIG. 5, an exemplary remote equipment unit 102*a*, having an alarm transmitter 201*a* is illustrated. Alarm transmitter 201*a* may be coupled to existing remote equipment units, thereby supporting portability.

Alarm transmitter 201*a* comprises a wireless interface 501 for communicating to wireless network 120. For example, a basic transceiver may be coupled to each pre-existing remote equipment unit by an interface device which is adapted to the type of equipment. Wireless interface 501 is used for transmitting alarm signals from remote equipment unit 102a to wireless network 120. Alarm transmitter 201a also comprises an analog multiplexer (AMUX) 508 which is capable to collect analog alarm signal and then to an analog-to-digital converter (A/D) 510. A/D converts the analog alarm signals to a digital signal representative of the alarm condition, and passes the resulting digital signal to wireless interface 501. Wireless interface 501 then transmit the digital alarm signal to wireless network 120.

Alarm transmitter 201a may comprise a microprocessor 514 having signal processing capabilities, for example, microprocessor 514 may periodically check for any alarm conditions present on the remote equipment unit and report the results to central controller 130 via wireless network 120. Microprocessor 514 may also generate a fault condition message for transmission to wireless network 120. Such a fault condition would occur if there were excessive operational failures sensed on the remote equipment unit including if there were a local blackout or brownout. The fault condition message may contain an encoded representation of the actual failures sensed.

Figure 6:
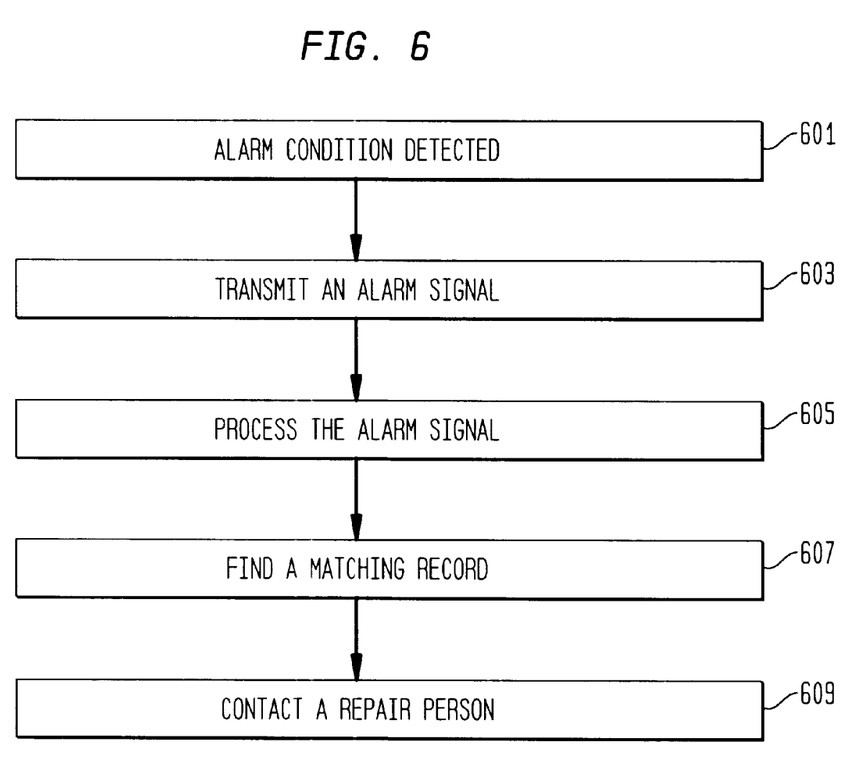
FIG. 6 is a flow diagram depicting one process utilizing the distributed communications system of FIG. 1.

FIG. 6 depicts a flow diagram of one process utilizing system 100 of FIG. 1. Generally, the process starts when an alarm condition is detected at one of the remote units by the corresponding alarm transmitter (block 601). The alarm transmitter then processes the alarm condition and transmits an alarm signal to central controller 130 via wireless network 120 (block 603).

Central controller 130 receives an incoming alarm signal and evaluates it to determine its source (i.e., to determine the identity of the transmitting alarm transmitter and the corresponding remote equipment unit) (block 605). Central controller 130 also determines the nature of the alarm condition. Central controller 130 then searches its database to find a matching data record in the database (block 607). Generally, the matched data record contains the contact information about the repair person responsible for repair of the transmitting alarm transmitter and its corresponding remote equipment unit.

After a matching record has been identified, the contact information about the repair person is processed and the corresponding wireless pager of the repair person is alerted (block 609). In the case of numeric pagers, a corresponding equipment code may be transmitted indicating that repair person should visit the identified remote equipment location. In case of text pagers, a more detailed message may be transmitted. For example, the message may say "Equipment 102c needs repair. Report immediately."

Generally, central controller 130 transmits messages to the wireless pagers upon the receipt of alarm messages from the receipt of alarm signals from the remote equipment units. But, in case of routine maintenance, central controller 130 may not wait for an incoming alarm signal. Instead, central controller 130 tracks the maintenance schedule based on a pre-recorded program in its memory, and automatically generates control messages to be transmitted to corresponding wireless pagers of the repair persons. In case of numeric pagers, a corresponding equipment code may be transmitted indicating that service associate should visit that particular remote equipment location to perform a routine maintenance. In case of text pagers, a more detailed message may be transmitted. For example, the message may say "Equipment 102c is due for a routine maintenance. Report at earliest convenience."

The principles of the present invention are flexible and the present invention may be practiced with a plurality of different networks. In one embodiment, the neural networks may be utilized to sense maintenance needs on the remote equipment units, and the data relating to maintenance needs may be transmitted over a third generation wide-band CDMA network to alert a technician.

In another embodiment, the known multilayer neural networks may be incorporated in the architecture of remote equipment units. In a neural network-based process control, neural networks are used to detect and measure any maintenance condition. The neural network pattern classification and intensity analysis capabilities allows powerful, real-time monitoring capabilities. In this embodiment, neural wireless networks may be used for transmitting maintenance conditions.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. In a system comprising a central controller remotely located from a plurality of equipment units, a method for maintaining operability of the equipment units, comprising the steps of:
    (a) determining at the central controller that a service condition exists for a particular equipment unit remotely located from the central controller; and
    (b) automatically transmitting a service request to notify a repair person remotely located from both the central controller and the particular equipment unit about the service condition, wherein:
        the repair person is selected from a plurality of repair persons based on the service condition; and
        different repair persons are associated with different types of service conditions.

2. The method of claim 1, wherein:
    the service condition corresponds to an alarm condition at the particular equipment unit; and
    step (a) further comprises the steps of:
        (1) detecting the alarm condition at the particular equipment unit; and
        (2) automatically transmitting an alarm message identifying the particular equipment unit to the central controller.

3. The method of claim 2, wherein the alarm message further identifies a particular type of service condition and the repair person is selected by the central controller based on the particular type of service condition.

4. The method of claim 1, wherein the central controller maintains a repair database identifying different repair persons for different particular equipment units.

5. The method of claim 4, wherein the repair database further identifies different repair persons for different types of service conditions.

6. The method of claim 1, wherein:
    the service condition corresponds to a routine maintenance condition for the particular equipment unit; and
    step (a) further comprises the steps of:
        (1) maintaining at the central controller a maintenance schedule for each equipment unit; and
        (2) determining at the central controller that the routine maintenance condition exists for the particular equipment unit based on the maintenance schedule corresponding to the particular equipment unit.

7. The method of claim 1, wherein the service request comprises a paging message to a pager of the repair person.

8. A central controller for maintaining operability of a plurality of equipment units remotely located from the central controller, wherein:

the central controller determines that a service condition exists for a particular equipment unit remotely located from the central controller; and the central controller automatically transmits a service request to notify a repair person remotely located from both the central controller and the particular equipment unit about the service condition, wherein:

the central controller selects the repair person from a plurality of repair persons based on the service condition; and different repair persons are associated with different types of service conditions.

9. The central controller of claim 8, wherein:

the service condition corresponds to an alarm condition at the particular equipment unit; and the central controller receives an alarm message identifying the particular equipment unit that was transmitted from the particular equipment unit in response to the alarm condition.

10. The central controller of claim 9, wherein the alarm message further identifies a particular type of service condition and the repair person is selected by the central controller based on the particular type of service condition.

11. The method of claim 8, wherein the central controller maintains a repair database identifying different repair persons for different particular equipment units.

12. The method of claim 11, wherein the repair database further identifies different repair persons for different types of service conditions.

13. The central controller of claim 8, wherein:

the service condition corresponds to a routine maintenance condition for the particular equipment unit;

the central controller maintains at a maintenance schedule for each equipment unit; and the central controller determines that the routine maintenance condition exists for the particular equipment unit based on the maintenance schedule corresponding to the particular equipment unit.

14. The central controller of claim 8, wherein the service request comprises a paging message to a pager of the repair person.

15. In a system comprising a central controller remotely located from a plurality of equipment units, an alarm transmitter configured to a particular equipment unit remotely located from the central controller for maintaining operability of the particular equipment unit, wherein the alarm transmitter detects an alarm condition at the particular equipment unit and automatically transmits an alarm message identifying the particular equipment unit to the central controller, which, in turn, transmits a repair request to a repair person remotely located from both the central controller and the particular equipment unit about the alarm condition, wherein:

the central controller selects the repair person from a plurality of repair persons based on the service condition; and different repair persons are associated with different types of service conditions.

16. The alarm transmitter of claim 15, wherein the alarm message further identifies a particular type of alarm condition, wherein the repair person is selected by the central controller based on the particular type of service condition.

17. The alarm transmitter of claim 15, wherein the alarm transmitter is based on neural networks, and the alarm messages are transmitted via neural wireless networks.

* * * * *